(12) United States Patent
Holscher

(10) Patent No.: US 6,582,149 B1
(45) Date of Patent: Jun. 24, 2003

(54) COUPLING DEVICE FOR CONNECTING A FIRST WORKPIECE TO A SECOND ONE

(76) Inventor: Winfried K. W. Holscher, Operzellerhau 27, 78224 Singen (DE)

( * ) Notice: Subject to any disclaimer, the term of this patent is extended or adjusted under 35 U.S.C. 154(b) by 0 days.

(21) Appl. No.: 09/857,993

(22) PCT Filed: Dec. 13, 1999

(86) PCT No.: PCT/EP99/09867

§ 371 (c)(1),
(2), (4) Date: Jun. 13, 2001

(87) PCT Pub. No.: WO00/36311

PCT Pub. Date: Jun. 22, 2000

(30) Foreign Application Priority Data

Dec. 15, 1998 (DE) .................................. 298 22 303 U
May 15, 1999 (DE) .................................. 299 08 630 U
Jun. 15, 1999 (DE) .................................. 299 10 404 U

(51) Int. Cl.$^7$ .................................................. F16B 9/00
(52) U.S. Cl. ..................... 403/255; 403/252; 403/259; 403/240; 403/292
(58) Field of Search .......................... 52/656.9, 655.1, 52/79.12, 653.1, 36.4; 403/390, 292, 384, 350, 367, 368, 382, 403, 345, 230, 252–256, 259, 240; 411/85, 84, 412, 413

(56) References Cited

U.S. PATENT DOCUMENTS 5,171,098 A * 12/1992 Jost ............................ 403/252
5,173,001 A * 12/1992 Schunke ...................... 403/252
5,192,145 A * 3/1993 Rixen et al. ................. 403/255
5,536,127 A * 7/1996 Pennig ........................ 411/413

FOREIGN PATENT DOCUMENTS

| DE | 38 29 306 | 3/1990 |
| DE | 9212696 | 9/1992 |
| DE | 29717089 | 1/1998 |
| EP | 0 136 431 | 4/1985 |
| GB | 1 256 226 | 12/1971 |

* cited by examiner

Primary Examiner—Lynne H. Browne
Assistant Examiner—Michael P Ferguson
(74) Attorney, Agent, or Firm—Bachman & LaPointe, P.C.

(57) ABSTRACT

A connecting device for the connection of a first workpiece provided with at least one undercut longitudinal groove to a second workpiece which in turn is provided with a longitudinal groove or grooves has at least one extent which exceeds the width of the narrow cross-section of the longitudinal groove or grooves and at least one main body which can be partially fitted into the narrow cross-section of the longitudinal groove and which has longitudinal lateral shoulder surfaces extending on both sides of a ridge bar or the like central portion. At least one pin-like connection member which is adapted to be connected to the workpiece or the profile bar passes through the main body in the region of the ridge bar; outside the main body the connecting device is provided with a connection element for the other workpiece.

8 Claims, 5 Drawing Sheets

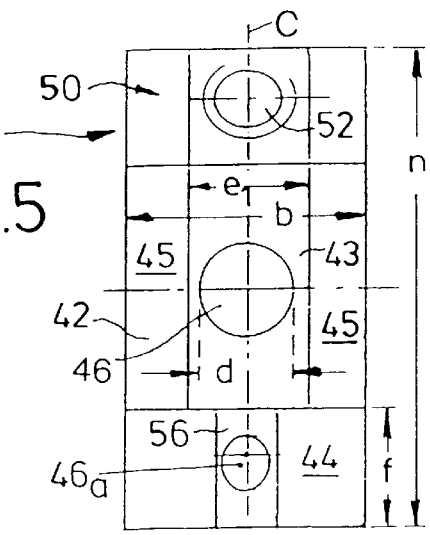
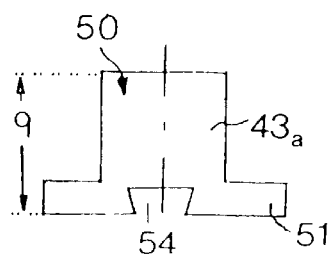
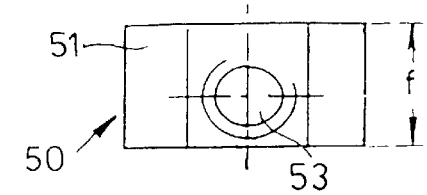
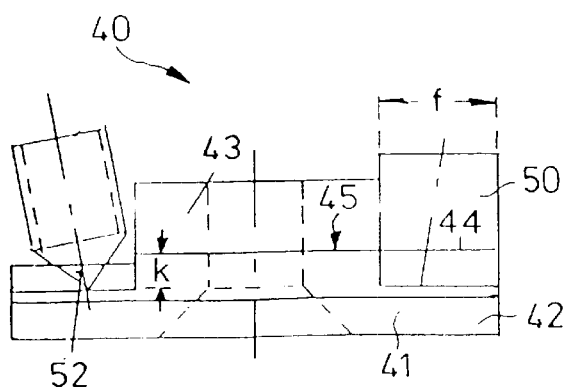
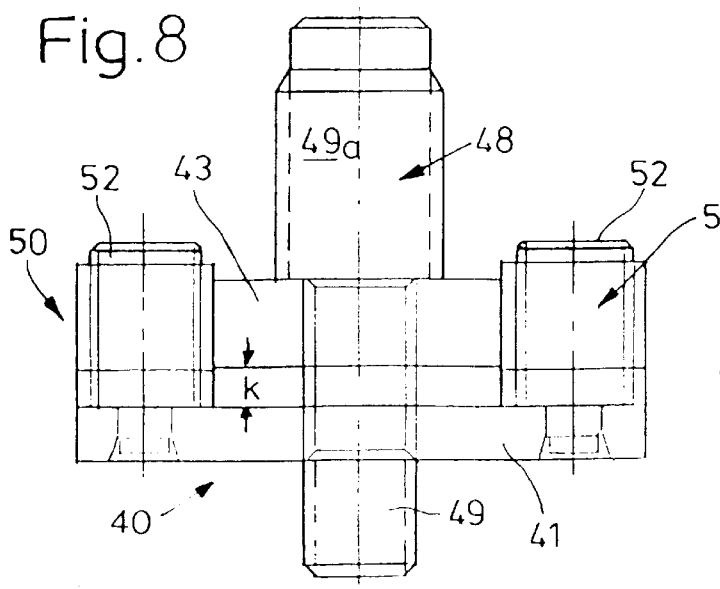
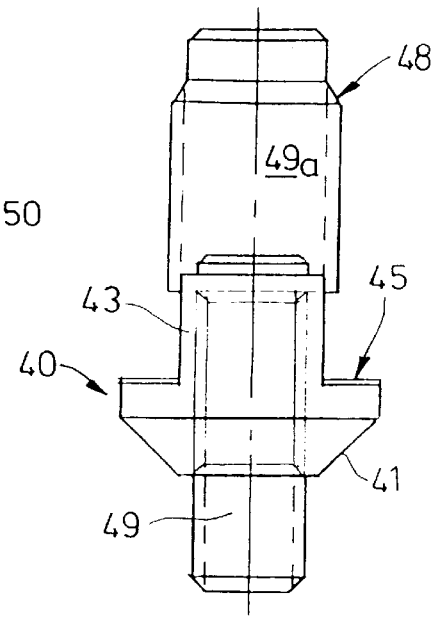

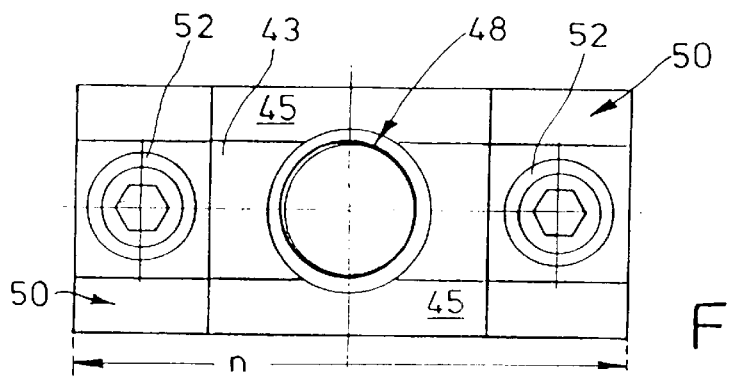
Fig.10
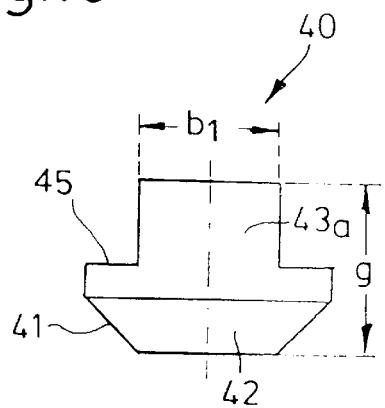
Fig.12
Fig.11
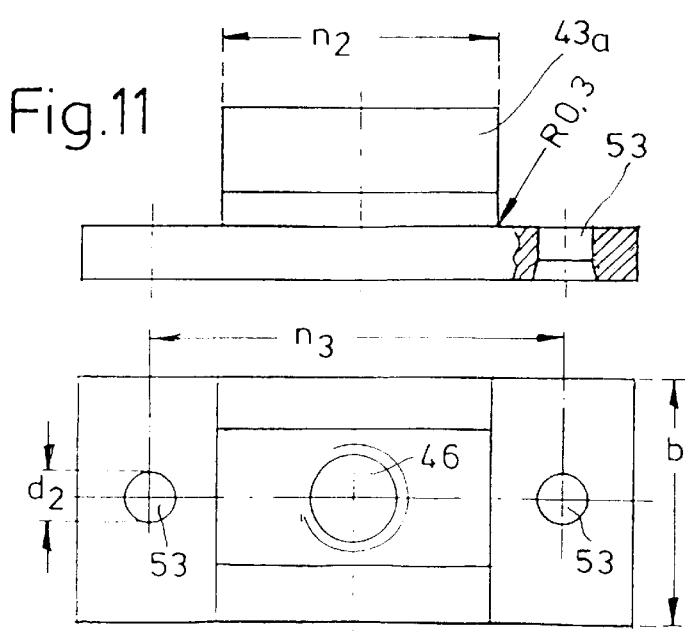
Fig.13
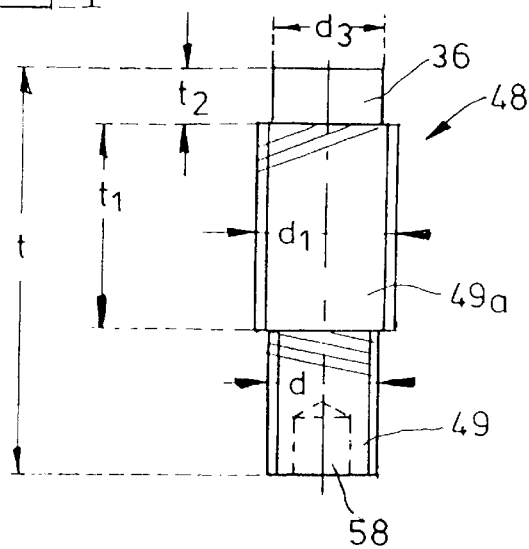
Fig.14

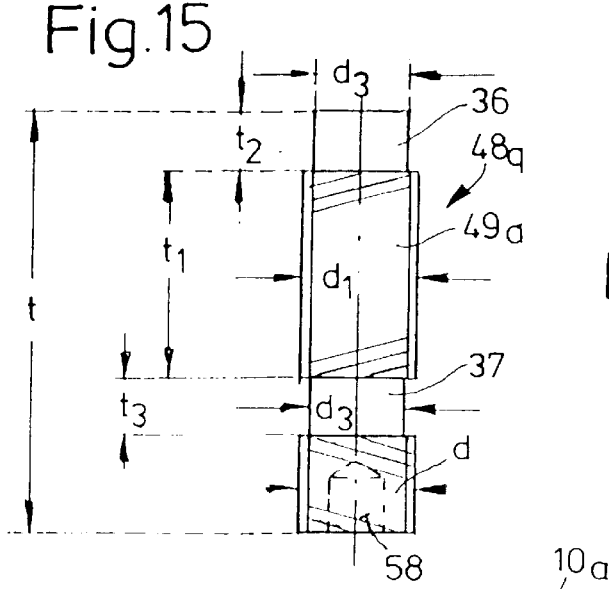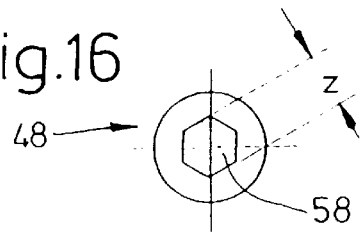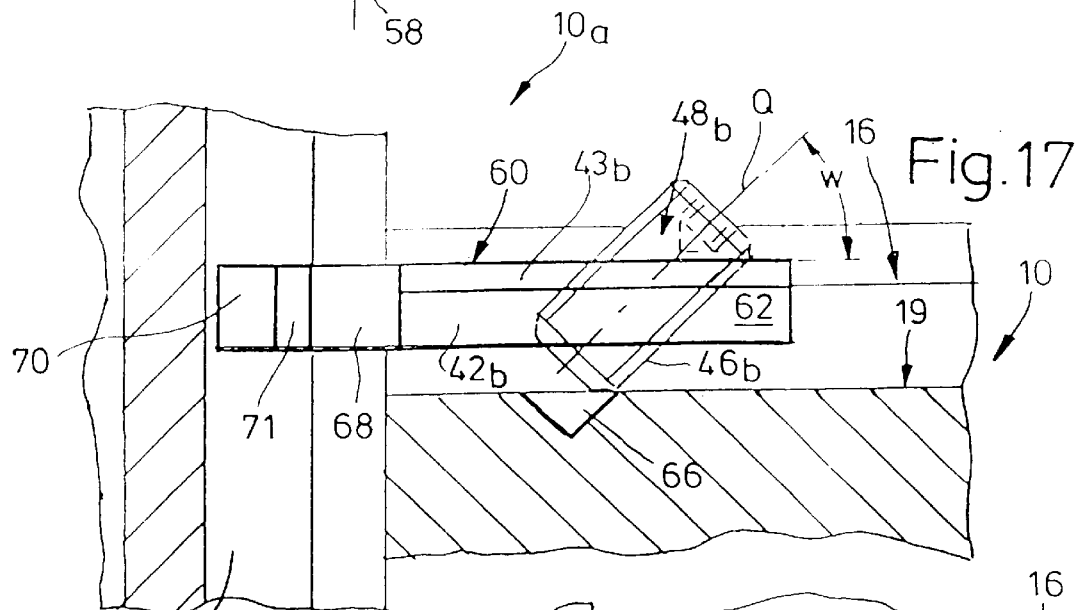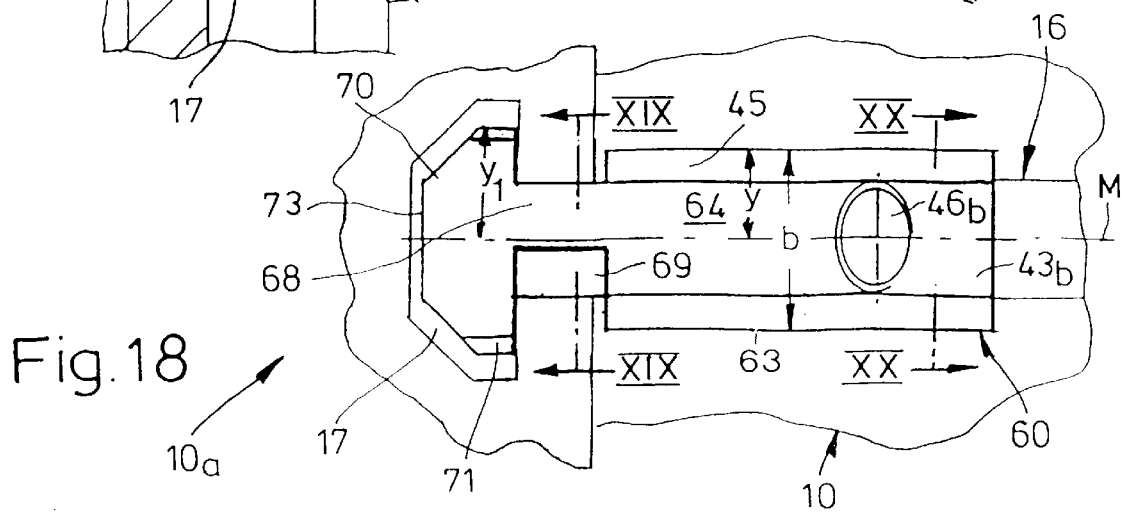

COUPLING DEVICE FOR CONNECTING A FIRST WORKPIECE TO A SECOND ONE

BACKGROUND OF THE INVENTION

The invention concerns a connecting device for the connection of a first workpiece—provided at least with one undercut longitudinal groove—to a second workpiece which is in turn provided with a longitudinal groove or grooves, wherein the connecting device is at least of an extent which exceeds the width of the narrow cross-section of the longitudinal groove or grooves; in particular the connecting unit is to be used in relation to profile bars of polygonal cross-section—preferably in relation to extruded profile members of rectangular cross-section—with longitudinal grooves extending in the side walls of the profile members.

The specification of the applicant's DE-U 92 12 696 discloses a nut-like element as a connecting device, which in particular is used in relation to hollow profile members which are extruded from light metal and the internal space of which is not accessible from the exterior. That previously known element is admittedly of a parallelepipedic configuration and has at least two mutually oppositely disposed flank walls which are inclined at an angle, as well as a spring member which on the one hand bears fixedly against one of the inclined flank walls and which on the other hand engages with its free end over the narrower surface of the element; in the relaxed condition of the spring that end is arranged at a spacing relative to the element. When the spring member is pressed against the nut element, the latter can be readily inserted—with its narrow side leading—into the groove of the undercut configuration.

The applicant's DE-U-297 17 089 also discloses for hollow profile members with longitudinal grooves which open towards the end of the profile member, a connecting device in the form of a loop-shaped clamping connector which has loop limbs projecting approximately at a right angle at both ends from a base plate; at the transition of the base plate, side slots on both sides delimit a central limb neck configuration. An angular clamping connector which is also described therein is provided at one end of a base plate with a loop limb which projects approximately at a right angle; in this case also side slots at both sides delimit at the transition of the base plate a central limb neck configuration.

In consideration of those systems, it is the object of the invention to provide a further fixing option for pairs of, in particular extruded hollow profile members of polygonal—in particular rectangular—cross-section. The invention seeks to provide that this connecting device can be fitted quickly and easily and is very substantially resistant to rotation.

SUMMARY OF THE INVENTION

That object is attained by providing a connecting device for the connection of a first workpiece provided with at least one undercut longitudinal groove to a second workpiece which in turn is provided with a longitudinal groove or grooves, wherein the connecting device has at least one extent which exceeds the width of the narrow groove cross-section of the longitudinal groove or grooves, in particular a connecting device for profile bars of polygonal cross-section with longitudinal grooves extending in the side walls of the profile members, characterised in that the connecting device has at least one main body which can be partially fitted into the narrow cross-section of the longitudinal groove and which has longitudinal lateral shoulder surfaces extending on both sides of a ridge bar or the like central portion, which in the region of the ridge bar has passing therethrough at least one pin-like connection member which is adapted to be connected to the workpiece or the profile bar, wherein the connecting device outside the main body is provided with a connection element for the other workpiece. The scope of the invention also embraces all combinations of at least two of the features disclosed in the description and the drawing.

In accordance with the invention the connecting device has at least one main body which can be partially fitted into the narrow groove cross-section of the longitudinal groove, with longitudinal lateral shoulder surfaces which extend on both sides of a ridge bar or the like central portion and which in the connecting position bear against the inside of shaped rib grooves, which main body in the region of the ridge bar has passing therethrough at least one pin-like connection member which is adapted to be connected to the workpiece or the profile bar; the connecting device is additionally provided outside the main body with a connection element for the other workpiece.

In a preferred embodiment of the connecting device at least one of the ends of its ridge bar, the main body is provided with a shoulder surface which transversely connects the longitudinal lateral shoulder surfaces, as a support surface for a clamping block which can be fixed thereon. Its width and the width of the ridge bar are to correspond to the width of the slot of the longitudinal groove—that is to say the region of the groove which is not undercut—so that those parts of the connecting device can be introduced into same.

If there is a wish to connect to the one workpiece or profile member a second workpiece with a—preferably central—bore-like passage, at a right angle, then the pin-like connection member which projects from the ridge bar of the main body is introduced into that passage and fixed therein.

For that purpose, it has proven to be desirable for the connection member to be in the form of a screw pin with two screwthreaded regions which are preferably to be provided with opposite screwthreads and/or which are to be of different diameters. The latter measure facilitates in particular orientation upon assembly; the screwthreaded region of smaller diameter is associated with the main body which affords the corresponding screwthreaded bore. The same purpose can be served by the measure of providing that the longitudinal-side shoulder surfaces extend in displaced relationship in respect of height by a distance in relation to the transverse shoulder surface or surfaces.

In accordance with the invention at least the screwthreaded region which projects outside the main body is provided with a self-forming thread so that it can be firmly introduced into the counterpart workpiece in the event of the counterpart workpiece having a smooth—that is to say thread-less—passage.

In order to permit movement of the clamping block in the longitudinal direction of the connecting device, a guide leg for a groove of the clamping block projects from the transverse shoulder surface; the groove is advantageously of an undercut configuration in cross-section and the guide leg is of a corresponding cross-section. However, the clamping block can also be connected to the main body by a screw—which is possibly provided in inclined relationship—and may have inclined corner regions at its underneath surface, parallel to the longitudinal side shoulder surfaces.

The two clamping blocks which are movable in the longitudinal direction of the workpiece or the profile bar engage into the longitudinal groove of the profile bar and thereby provide a means for preventing rotation thereof. The element is pushed into the longitudinal groove of the profile bar and fixed at the desired position by tightening the screws in the clamping blocks. The described connection can be released at any time and can be moved in the longitudinal direction of the second profile bar. In that situation, the two profile bars remain undamaged; the connection thereof does not involve any mechanical processing treatment. The screw in the clamping block, by engaging into the guide bar of the main body, prevents it from falling out. When the screws are firmly tightened however a bracing effect is produced in the groove of undercut configuration. Inclined positioning of the screws in the clamping blocks is advantageous so that the pressure points are as close together as possible.

In another connecting device, in accordance with the invention, formed on the main body thereof at one end is a hammerhead-like insertion element, by means of a neck which is on the center line of the main body; in this arrangement the spacing of the flank surfaces of the hammerhead from the center line is to be greater than the spacing thereof from the side edges of the main body. The hammerhead is inserted into the undercut longitudinal groove in the workpiece which is associated with the profile member or workpiece for receiving the main body.

It has proven to be desirable if in this case a screw pin passes through the main body, which screw pin can be inclined at an angle relative to the surface of the main body. That screw pin should be inserted beneath or outside the underneath surfaces of the main body into a—also inclined—notch in the deepest part of the longitudinal groove which accommodates the main body; that notch is to be previously produced without any difficulty by means of an auxiliary tool and the position thereof can be freely selected—depending on the respective factors involved—upon assembly.

The screw pin, preferably a grub screw, is first screwed in after the connecting device has been pivoted into position and is then between the shoulder surfaces which—as stated—bear against the inside of the longitudinal groove. When the screw pin is tightened the connecting device is urged upwardly and at the same time with its stepped cross-section into the longitudinal groove of the profile member. In that procedure on the other hand the hammerhead pulls the second profile member against the end face of the first profile member. A prerequisite in that respect is the above-mentioned provision of the notch at a precise spacing relative to the end face at the deepest part of the groove in the first profile member.

The scope of the invention also embraces a further design configuration in the form of a plate-like or strip-like main body through which, near the end faces thereof, passes at least one respective screw pin; they are preferably inclined relative to each other, in which case their tips—which engage into notches at the deepest part of the groove—are closer to each other than their actuating ends which are above the main body. By virtue of that feature, a pulling force is applied to two workpieces or profile members with aligned longitudinal grooves which jointly receive the main body, in other words, the end faces thereof are pressed against each other.

As already set forth above, the main body is inserted at the end into the longitudinal groove of the first profile member and lightly fastened with the one screw pin. The second profile member is then fitted in aligned relationship at the end on to the first profile member, being guided by the main body. The screw pins are now firmly tightened, in which case the main plate is urged upwardly into the groove in the two profile members and at the same time the two profile members are braced against each other.

In this case also the notches are produced with a simple auxiliary tool; the screw pins are securely held therein.

The following have been found to constitute particular advantages of the connecting system according to the invention:

no machining treatment required;

quick and easy assembly;

a connection which is force-locking and secured to prevent rotational movement;

potential compensation by virtue of notch edges;

no external damage to the profile member, and subsequent installation is possible.

BRIEF DESCRIPTION OF THE DRAWINGS

Further advantages, features and details of the invention will be apparent from the description hereinafter of preferred embodiments and with reference to the drawing in which:

FIG. 5 is a plan view of the main body of the clamping connector with two clamping blocks of which one is withdrawn from the main body, FIG. 6 shows a side view of the clamping connector with clamping block fitted thereon, FIG. 7 is an end view of the clamping block, FIGS. 8 and 9 show a side view and an end view of another embodiment of the clamping connector, FIG. 10 is a plan view of FIG. 8, FIGS. 11 and 12 show a side view and an end view of a part of the clamping connector of FIGS. 8 through 10, FIG. 13 is a plan view of FIG. 11, FIGS. 14 and 15 show two different screw pins for the clamping connector, FIG. 16 shows an end view in relation to the structure of FIG. 15, FIG. 17 is a side view of another clamping connector in two hollow profile members which are shown in part and in cross-section, FIG. 18 shows a plan view of the clamping connector shown in FIG. 17, FIGS. 19 and 20 are views in cross-section through FIG. 18 taken along lines XIX—XIX and XX—XX therein.

DETAILED DESCRIPTION

Figure 1:
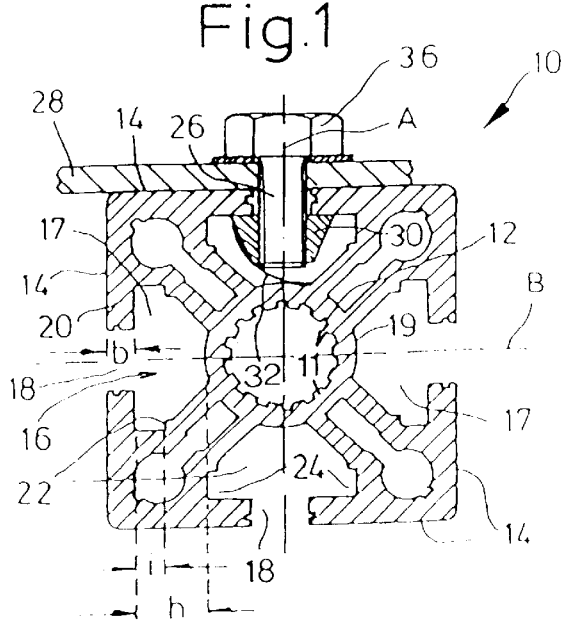
FIG. 1 is a view in cross-section through an extruded hollow profile member with fixing means arranged therein.
Figure 2:
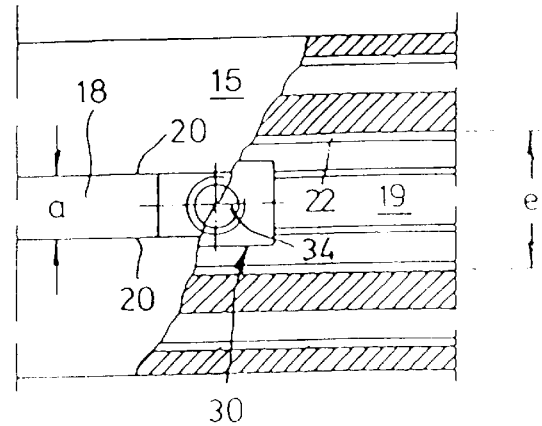
FIG. 2 is a partly sectional plan view of FIG. 1.

An extruded hollow profile member 10 with cross-section axes A, B as axes of symmetry which are passed through a central passage 12—which provides a female screwthread 11—of round cross-section of an inside diameter dl has in the middle of each of its profile side walls 14 a respective longitudinal groove 16 with a groove region 17 which is of an undercut cross-sectional configuration. The slot 18 of the longitudinal groove 16, which is present in the surface of each of the side walls 14 of the profile member, is of a width a of for example 8 mm and is delimited at the surface 15 of the side wall 14 of the profile member by lateral shaped ribs 20 which extend in that side wall 14 as parts thereof, being of a thickness b of for example 4 mm.

The undercut groove region 17 is a channel-like opening over which the ribs 20 extend, being approximately of triangular cross-section, of a depth n of for example 10 mm and of a maximum width e of here 22 mm, and in FIG. 1 at the inside of the ribs 20 affords an insertion path 24 of a height h, which is delimited towards the deepest part 19 of the groove by wall steps 22. The deepest part 19 of the groove is afforded by the outside surface of the central tubular portion 12 of the hollow profile member 10.

Fitted into the groove region 17 of undercut configuration, by way of example in FIG. 1, is a fixing unit 26 for a plate 28 comprising a captive nut member 30 which is formed from a steel alloy, and a spring tongue 32. The spring tongue 32 is fixed at one end to a flank surface of the captive nut member 30 and its free edge lies against the deepest part 19 of the groove. The captive nut member 30 is held by a screw 36 which passes through a central screwthreaded hole 34.

Figure 3:
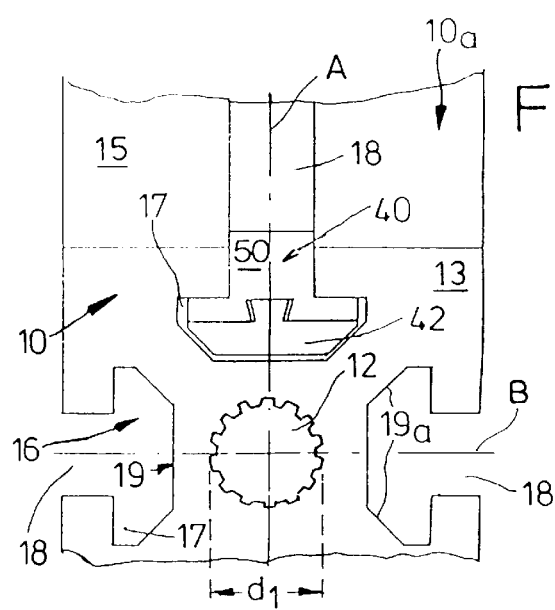
FIG. 3 is an end view of a part of a hollow profile member including a clamping connector and a side view of a second hollow profile member associated at a right angle therewith.

FIG. 3 is a diagrammatically simplified view showing the end face 13 of a hollow profile member 10 to which a second hollow profile member $10_a$ is fixed at a right angle by means of a clamping connector 40 made from a steel material; the clamping connector 40 is inserted with a bar-like main body 42 which is profiled to correspond to the cross-section of the longitudinal groove 16 into one of the undercut longitudinal grooves 16; formed on the main body 42 which is adapted in respect of cross-section by suitable corner regions 41 to the undercut groove region 17 with inclined surfaces $19_a$ on both sides and which is for example of a width b of 18 mm and a length n of 40 mm is a narrow ridge bar 43 of a width $e_1$ of about 10 mm, on the longitudinal center of the main body; the ridge bar 43 terminates at both ends at a spacing f from the end face of the main body 42. Provided in those spacing regions and on both sides of the ridge bar 43 are shoulder surfaces 44 and 45 respectively, wherein the lateral shoulder surfaces 45 are disposed by a distance k above the transverse shoulder surfaces 44 which are towards the end and which are therefore stepped.

The ridge bar 43 has a central screwthreaded bore 46 passing therethrough, for a screw pin 48 with two screwthread regions 49, $49_a$ of different diameters d, $d_1$. The larger diameter di corresponds to the inside diameter $d_1$ of the central tubular portion 12 of the hollow profile members 10, $10_a$ and is screwed in the tubular portion 12 of the hollow profile member $10_a$.

Fitted on each of the shoulder surfaces 44 is a clamping block 50 of a length f—comprising a ridge bar $43_a$ and a main plate 51 projecting in a wing-like configuration on both sides thereof—and is fixed by a grub screw 52 engaging into a screwthreaded bore 46a in the shoulder surface 44; the screwthreaded bore in the clamping block 50 is identified by reference 53. The cross-section of the clamping block 50 is of such a configuration that—as FIG. 6 in particular shows—it supplements the main body 42 and the ridge bar 43, in which respect it projects somewhat beyond the latter with a height q of in this case 10 mm.

A groove 54 of a slightly undercut configuration is provided on the longitudinal center in the underneath surface of the main plate 51 in order to be able to push the clamping block 50 on to a guide leg 56 which is shaped out of the shoulder surface 44. The clamping block 50 is slid able on the longitudinal axis C of the main plate 51.

The two clamping blocks 50 which are movable in the longitudinal direction of the hollow profile member 10 therefore engage into the slot 18 of the longitudinal groove 16 of the hollow profile member or profile bar 10 and provide a means for preventing rotational movement. The element or the clamping connector 40 is now pushed into the longitudinal groove 16 of the hollow profile member or profile bar $10_a$ and secured at the desired position by tightening the two screws 52 in the clamping blocks 50.

The connection can be released at any time and can be moved in the longitudinal direction of the profile bar $10_a$. Both hollow profile members or profile bars 10, $10_a$ remain undamaged as no mechanical processing treatment is involved in making this connection. By virtue of engaging into the guide leg 56 of the main body 42 the screw 52 in the clamping block 50 prevents it from falling out. When the screws 52 are firmly tightened however there is a bracing effect in the undercut groove region 17. Inclined positioning of the screw 52 in the clamping blocks 50 is advantageous so that the pressure points are as close together as possible. The inclined positioning is also advantageous in terms of the assembly procedure.

The end regions of the screws 48, 52 can be of different configurations (pointed, flat, cylindrical or the like).

The drawing does not show that the clamping connector 40 can also be provided with only one shoulder surface 44—and therefore with only one clamping block 50 disposed at one end.

The clamping connector 40 in FIGS. 8 through 10 does not have the above-described pairing 54/56. The length n of the clamping connector 40 in this case measures about 40 mm, the width b is about 18 mm, the width $b_1$ of the ridge bar $43_a$ is here 10 mm and the length $n_1$ thereof is for example 20 mm. The spacing $n_3$ of the screwthread bores 53 from each other is then 30 mm with a diameter $d_2$ of 4 mm.

The screw pin 48 of the length t of in this case 30 mm in FIG. 14 is provided in its two screwthreaded regions 49, $49_a$—of diameters d=M8 and $d_1$=M 10—with mutually opposite screwthreads; the screwthread which is the upper one in FIGS. 14 and 15 is self-tapping. In addition, provided in the end of the screwthreaded region 49 is a hexagonal recess 58 of a width Z=SW4. The axial length t1 of the thicker screwthreaded region $49_a$ in this case measures 15 mm, while the length $t_2$ of a cylindrical extension 36 in this case measures 4 mm with a diameter $d_1$ of 8 mm.

In the embodiment of the screw pin $48_a$ shown in FIGS. 15 and 16, provided between the screwthreaded regions 49, $49_a$ of equal diameter d, $d_1$ is an intermediate portion 37 of a diameter $d_3$ of 6.5 mm. The length $t_3$ of that intermediate portion 37 measures 4 mm.

Figure 20:
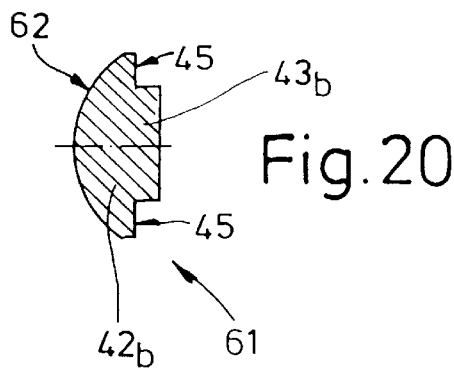

The two hollow profile members 10, $10_a$ in FIG. 17 are held together by a clamping connector 60 which can be pivoted from the exterior into the longitudinal grooves 16. It comprises a profiled strip 61 of material which, as shown in FIG. 20, comprises a main body $42_b$ of a width b with an underneath surface 62 which is curved in a partly circular configuration in cross-section, and a ridge bar $43_b$ which is formed thereon and which is accompanied on both sides by shoulder surfaces 45, that is to say in cross-section it involves a stepped configuration.

The main body $42_b$ has a screw hole $46_b$ passing therethrough, the axis Q of which is inclined at an angle w of about 45° relative to the surface 64 of the ridge bar; an inserted screw pin $48_b$ faces with its free end towards the adjacent hollow profile member $10_a$ and can be fitted into a notch 66 which has been previously impressed into the lowest part 19 of the groove by means of an auxiliary tool. The inclinedly extending pin screw or screws or screw pin or pins 48 is or are screwed in only after the clamping connector 60 has been pivoted into position.

The clamping connector 60 can be subsequently fitted into an existing structure. The hollow profile member 10 is sawn to the precise length, notched on both sides and positioned between the other two hollow profile members. The clamping connector 60 without the pin screw 48$_b$ is now pivoted into both profile members. The pin screw 48$_b$ is screwed in and the profile member is joined in force-locking relationship. When two clamping connectors 60 of that kind are fixed to one end, that affords a configuration such as to prevent rotational movement.

Joined to the main body 42$_b$ by means of a neck 68 is a flat hammerhead 70 as an insertion element with flank surfaces 71 which are curved in the shape of part of a circle in cross-section and which are parallel to the axis and which go into side surfaces 72 which are inclined relative to the center line M of the clamping connector 60; the side surfaces 72 terminate at a front surface 73 which crosses the center line M. The spacing y of the flank surface 71 from the center line M is larger than the spacing y thereof from the side edges 63 of the main body 42$_b$.

Figure 19:
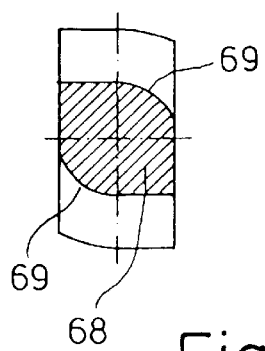
Figure 21:
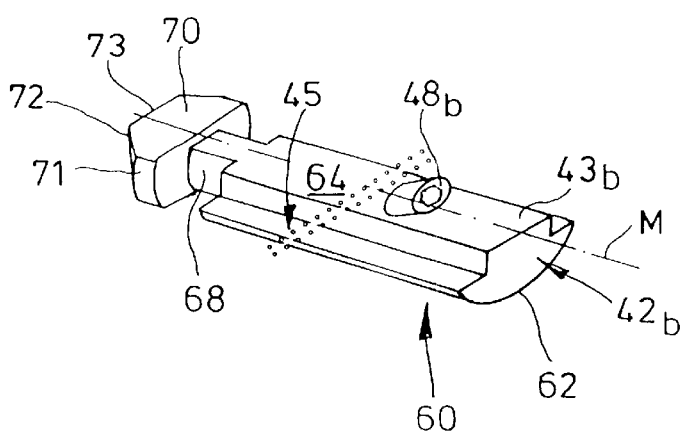
FIG. 21 is a perspective view of the clamping connector of FIGS. 17 and 18.

The neck 68 is symmetrical to the center line M in FIG. 21, but in FIGS. 17, 18 and 19 it is curved at corner regions 69 which are in diagonal relationship in cross-section.

When the screw pin 48 is tightened the screw connector 60 is urged upwardly and at the same time urged with the above-mentioned stepped configuration in cross-section at the lateral shoulder surfaces 45 into the longitudinal groove 16 of the first hollow profile member 10.

When the screw pin 48$_b$ is now firmly tightened the hammerhead 70 pulls the second hollow profile member 10$_a$ against the end face 13 of the first hollow profile member 10. A matter of substantial significance in regard to that procedure is the above-mentioned notch 66 which extends inclinedly in the axial direction Q and which is formed at a precise spacing relative to the end face 13 in the deepest part 19 of the groove of the first hollow profile member 10. That is effected by a simple auxiliary tool and the screw pin 48$_b$ enjoys a secure hold. Moreover the 90° notch 66 is arranged at the same inclination as the screw pin 48 and forms a support for same. Mechanical processing treatment is not required with that kind of connection.

Figure 4:
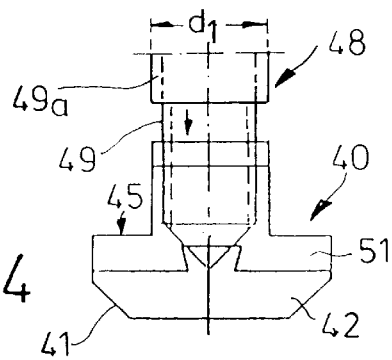
FIG. 4 is an end view of the clamping connector shown on an enlarged scale in relation to FIG. 3, with the main body and the ridge bar.
Figure 22:
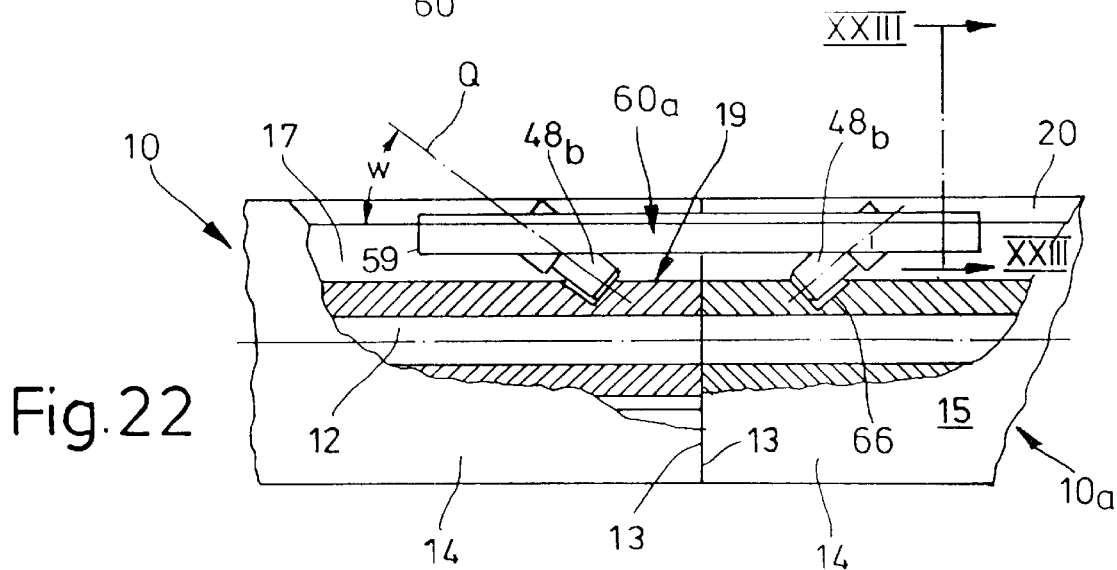
FIG. 22 is a partly sectional side view of two axially connected hollow profile members with a clamping element connecting them.
Figure 23:
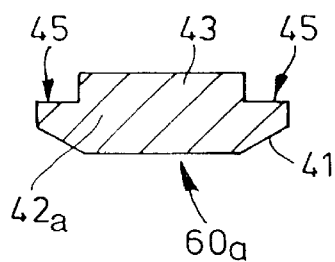
FIG. 23 is a view in section taken through FIG. 22 along line XXIII—XXIII therein.

The clamping connector 60$_a$ in FIGS. 22 and 23 with two screw pins 48$_b$ disposed at a spacing is intended to hold two axial hollow profile members 10, 10$_a$ together. It has a main body 42$_a$ whose cross-section approximately corresponds to that of the lower region in FIG. 4, with shoulder surfaces 45 extending on both sides of a ridge bar 43, and inclined corner regions 41 which are provided beneath same. The clamping connector 60$_a$ is fitted at the end into the longitudinal groove 16 of the first hollow profile member 10 and lightly fastened with the one of the screw pins 48$_b$ near the end faces 49, after it engages approximately half over both hollow profile members 10, 10$_a$.

Then the second hollow profile member 10$_a$ is fitted with its end face 13—guided by the clamping connector 60$_a$—on to the first hollow profile member 10. The screw pins or holding screws 48$_b$ are now firmly tightened, in which case the clamping connector 60$_a$ is urged upwardly into the longitudinal groove 16 of the hollow profile members 10, 10$_a$ and in that case the two are braced relative to each other.

In this case also a notch 66 is previously formed at a precise spacing relative to the end face 16 in the deepest part 19 of the groove in both hollow profile members 10, 10$_a$; the screw pins 48$_b$ are securely held in the notches 66.

It will be appreciated that a plurality of those clamping connectors 60$_a$ can be introduced into a plurality of grooves in the hollow profile member 10 from the ends 13 thereof.

What is claimed is:

1. A connecting device for the connection of a first workpiece provided with at least one undercut longitudinal groove to a second workpiece which in turn is provided with a longitudinal groove or grooves, and for the connection of profile bars of polygonal cross-section with longitudinal grooves extending in the side walls of the profile bars, wherein the connecting device has at least one extent which exceeds the width of a narrow groove cross-section of the longitudinal groove or grooves of the second workpiece, wherein the connecting device (40, 60, 60$_a$) has at least one main body (42, 42$_a$, 42$_b$) which can be partially fitted into the narrow groove cross-section (17) of the longitudinal groove of the second workpiece (16) and which has longitudinal lateral shoulder surfaces (45) extending on both sides of a ridge bar (43, 43$_b$), which in the region of the ridge bar has passing therethrough at least one connection member (48, 48$_b$, 48$_a$) which is adapted to be connected to the first workpiece or one of the profile bars (10,10$_a$), wherein the connecting device outside the main body is provided with a connection element (48, 48$_b$, 48$_a$; 70) for the second workpiece (10$_a$, 10) wherein the main body (42), at least one of the ends of its ridge bar (43), has a shoulder surface (44) which transversely connects the longitudinal lateral shoulder surfaces (45) as a support surface for a clamping block (50) which can be fixed thereon and has a width which corresponds to the width (e$_1$) of the ridge bar.

2. A connecting device as set forth in claim 1 wherein the connection member (48, 48$_a$) which projects from the ridge bar (43) of the main body (42) is adapted to be introduced into and fixed in a bore (12) of the first workpiece (10$_a$) which is to be connected at a right angle.

3. A connecting device as set forth in claim 1 wherein the connection member (48, 48$_a$) is a screw pin with two screwthreaded regions (49, 49$_a$) which are provided with a screwthreaded region of a smaller diameter the screwthreaded region (49) is associated with the main body (42).

4. A connecting device as set forth in claim 3 wherein at least one screwthreaded region (49$_a$) projects outside the main body (42) and is provided with a self-tapping thread.

5. A connecting device as set forth in claim 1 wherein the longitudinal lateral shoulder surfaces (45) extend by a distance (k) with respect to the shoulder surface (44) of the main body (42).

6. A connecting device as set forth in claim 1 wherein a guide leg (56) for a groove (54) of a clamping block (50) projects from the transverse shoulder surface (44), wherein the groove (54) is of an undercut configuration in cross-section and the guide leg (56) is of corresponding cross-section.

7. A connecting device as set forth in claim 6 wherein the clamping block (50) is supported on the main body (42) displaceably on a longitudinal axis (C) thereof.

8. A connecting device as set forth in claim 6 wherein the clamping block (50) is connected to the main body (42) by a screw (52).

* * * * *